Dec. 6, 1927.
C. W. BALKE
1,651,662
TUNGSTEN WELDING
Filed Nov. 24, 1926
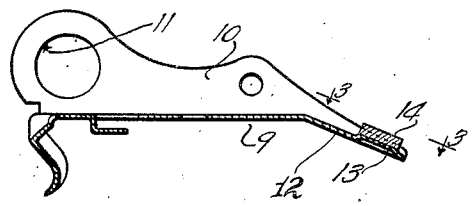
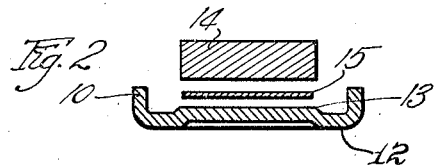
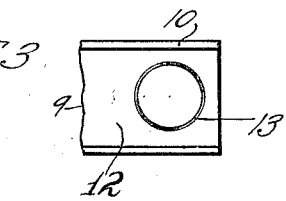
Inventor
Clarence W. Balke
Williams, Bradbury,
McCaleb & Hinkle
Attys.

Patented Dec. 6, 1927.

1,651,662

UNITED STATES PATENT OFFICE.

CLARENCE W. BALKE, OF HIGHLAND PARK, ILLINOIS, ASSIGNOR TO FANSTEEL PRODUCTS COMPANY, INC., OF NORTH CHICAGO, ILLINOIS, A CORPORATION OF NEW YORK.

TUNGSTEN WELDING.

Application filed November 24, 1926. Serial No. 150,405.

My invention relates to welding alloys, the specific problem being that of providing an improved alloy for welding tungsten contact discs directly to raised spots on nickel plated breaker arms of the type used in automotive ignition systems. By "welding to a raised spot," I refer to that process of welding where the correct positioning of the contact disc on the arm is accomplished by embossing a circular raised spot on the arm and placing the contact disc on the raised spot with a wafer of welding medium therebetween, the welding medium, when melted under heat, having the property of centering the disc on the raised spot.

The desiderata of a welding alloy answering the above problem would be the combination of the following properties, all of which are had by the welding alloy of my invention:

Initially white in color and remaining white after welding the tungsten to the nickel plated steel.

Giving a strong and firm weld.

"Floating" the disc to the center of the raised spot.

Leaving no discoloration of the welded parts.

The accompanying drawing illustrates rather diagrammatically the type of weld I refer to. Here, Fig. 1 shows a longitudinal section through a conventional breaker arm after the weld has been completed;

Fig. 2 is a transverse section through the breaker arm at the raised spot illustrating the manner of assembling the welded parts; and Fig. 3 is an elevation of the breaker arm showing the location of the raised spot.

The breaker arm 9 is generally channel shaped in cross section, the flanges 10 at one end having aligned holes 11 for a suitable pivot pin, and the web 12 at the opposite end of the arm having an outwardly embossed portion or raised spot 13 upon which the tungsten contact disc 14 is secured. In manufacture the contact disc 14 is placed on the raised spot 13 with a thin wafer 15 of the welding alloy therebetween, as indicated in Fig. 2. The assembled parts are then subjected to a welding heat, the alloy fusing and floating the disc to the mathematical center of the raised spot without the necessity of positioning or guiding by a jig or other fixture.

As to the composition of the alloy, I have found the following formula to give the most satisfactory results:

| | Per cent. |
|---|---|
| Silver | 60 |
| Copper | 15 |
| Nickel | 5 |
| Zinc | 20 |

The presence of some nickel in the alloy produces an unusually strong weld. This, I believe, is due to the fact that the nickel will truly alloy with the tungsten, whereas the other metals of the alloy do so only superficially.

The copper is of particular value in accentuating the property of floating the disc to the center of the raised spot, but the proportion of copper must be kept within its limits to avoid a coloring of the weld which would destroy its whiteness. The principal advantage of the introduction of copper, however, is its value in holding the nickel and silver together in an alloy, which ordinarily tend to segregate on cooling. The zinc, as well as the nickel, apparently aid the alloy in making the proper kind of a weld with the tungsten.

I have found it somewhat difficult to state the true proportions of the alloy, especially as regards the zinc, because, in making the alloy and in making the weld from the alloy, some of the zinc is apt to be volatilized.

While I have above stated what I consider the most desirable proportions as the formula for my welding alloy, I contemplate that some of the ingredients and their proportions may be varied within certain limits without departing from the scope or spirit of my invention.

What I claim is:

1. A welding solder for floating tungsten contact disks on nickel breaker arms of about the following proportions: silver 60%, copper 15%, nickel 5%, zinc 20%.

2. The method of welding tungsten contact disks to nickel breaker arms which comprises floating the disk in a molten alloy consisting of about the following proportions: 60% silver, 15% copper, 5% nickel and 20% zinc.

3. A welded joint comprising a nickel plated metal support, a tungsten element, and a solder including a large amount of silver, a less amount of copper and a still less amount of nickel.

In witness whereof, I hereunto subscribe my name this 18th day of November, 1926.

CLARENCE W. BALKE.